United States Patent [19]

Tabor

[11] 4,204,904
[45] May 27, 1980

[54] ROOFING MATERIAL HANDLING AND SEALING MACHINE

[76] Inventor: Donald R. Tabor, P.O. Box 1606, Anderson, Ind. 46014

[21] Appl. No.: 842,939

[22] Filed: Oct. 17, 1977

[51] Int. Cl.² .......................... B32B 31/00; B44C 7/00
[52] U.S. Cl. .................................... 156/497; 156/574
[58] Field of Search ................ 156/71, 306, 497, 498, 156/543, 556, 538, 322, 574

[56] References Cited

U.S. PATENT DOCUMENTS

| | | | |
|---|---|---|---|
| 2,084,625 | 6/1937 | Stebbins et al. | 156/499 |
| 2,367,725 | 1/1945 | Lindh et al. | 156/306 |
| 2,372,737 | 2/1945 | Phillips | 156/497 |
| 3,029,175 | 4/1962 | Stenqvist | 156/497 |
| 3,097,986 | 7/1963 | Kauer | 156/497 |
| 3,099,582 | 7/1963 | Ongstad | 156/578 |
| 3,660,191 | 5/1972 | Shimota et al. | 156/306 |
| 3,853,669 | 12/1974 | Werstlein | 156/497 |
| 4,087,309 | 5/1978 | Lang | 156/579 |

*Primary Examiner*—Douglas J. Drummond
*Attorney, Agent, or Firm*—Woodard, Weikart, Emhardt & Naughton

[57] ABSTRACT

A roofing material handling and sealing machine and method for installing partially-overlapping heat-sealable roll roofing material and the like. The machine consists of a frame having two spaced apart front wheels and one rear wheel, a heating element mounted to the frame and positioned on the underside thereof, and a lifting foot also mounted to the frame and positioned foward of the heating element. In operation, the two front wheels straddle the joint formed by the overlapping edge portions of two laid sheets of the roll roofing material, with the rear wheel pressing against the overlapping joint. The upper overlapping edge portion of the material is lifted by the lifting foot and the heating element is directed rearwardly so that when the machine is pulled along the overlapping joint, both contact surfaces on the overlapping edge portions of the material are heated to an extent sufficient to cause both contact surfaces to soften and thereby allow them to be sealably joined when the trailing rear wheel presses them together. The machine may be pulled manually along the overlapping joint or may be motorized by conventional methods.

7 Claims, 4 Drawing Figures

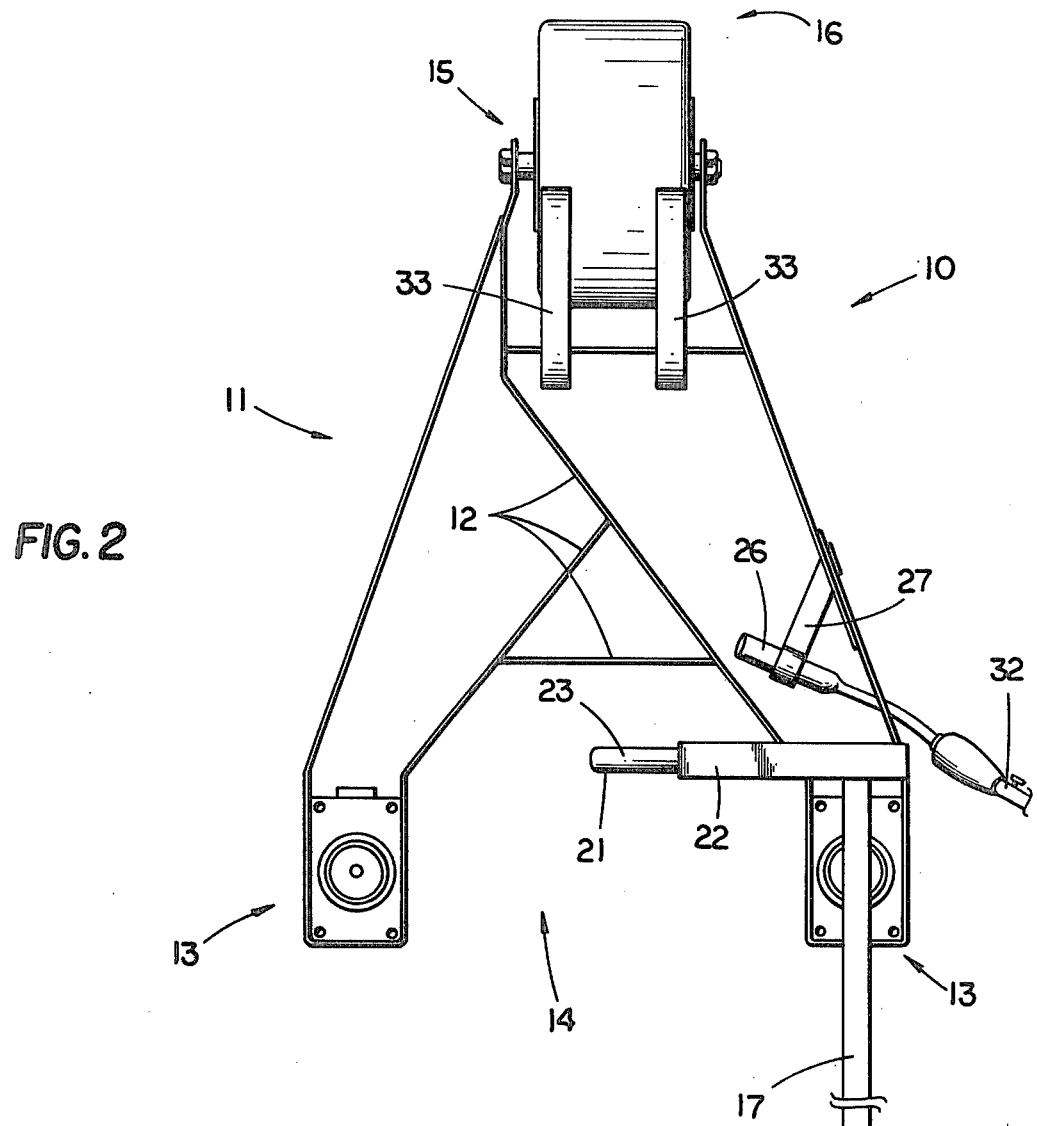
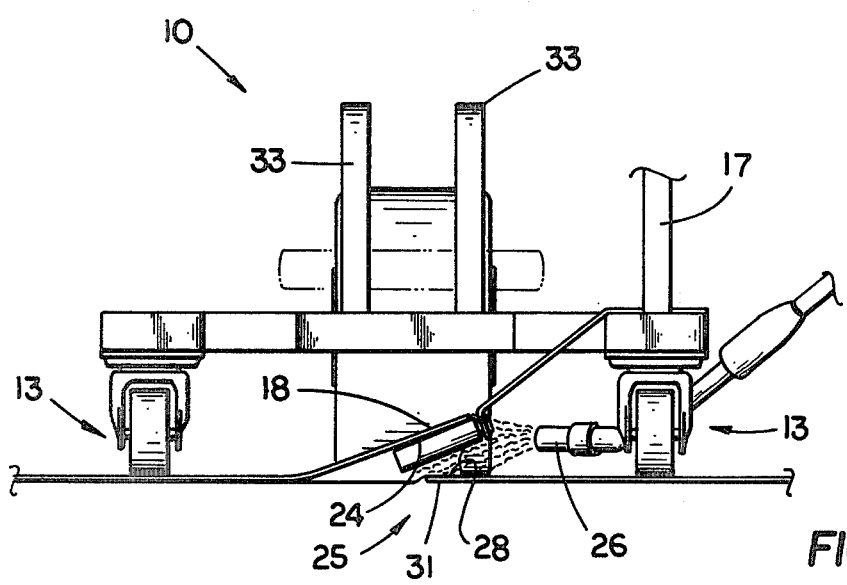

ROOFING MATERIAL HANDLING AND SEALING MACHINE

BACKGROUND OF THE INVENTION

This invention relates to the field of partially-overlapping heat-sealable roll roofing material and the like and, particularly, to an improved machine for handling and sealing such material during installation.

In the area of welding and sealing various heat-sealable materials such as thermoplastics, the prior art is full of various methods and apparata designed and constructed with specific objectives in mind. In this regard a patent issued to Sourber, U.S. Pat. No. 3,047,050, discloses a hand-held hot air welding apparatus designed for various strip-welding operations and including a roller adapted to sealably press the strip in position after it is heated. Alfter et al. U.S. Pat. No. 3,962,016, discloses a process and hand-held apparatus for joining abutting thermoplastic synthetic-resin foam structures for sheets by sealably pressing a heated metal strip onto the junction zone between two foam sheets. In this same regard, Werstlein, U.S. Pat. No. 3,853,669, and Wenzel U.S. Pat. No. 3,580,789, also disclose specialized welding gear for use with various hand-held thermoplastic welding apparata.

The prior art also reveals various other more complex apparata also adapted for very specific heat sealing purposes. One such apparatus is found in Bergstein et al., U.S. Pat. No. 2,676,642, which discloses a complicated unit and method for heat-sealing films including the operation of continuously heating an endless belt. Hakomaki et al., U.S. Pat. No. 2,635,673, also discloses a complex controlling device and tensioning means for seaming layers of various thermoplastic materials. In this same regard, Jacobi, U.S. Pat. No. 3,654,043, and two patents issued to Kauer, U.S. Pat. Nos. 3,097,986 and 3,060,077, disclose processes and various complex apparata for heat sealing entire sheets of such thermoplastic material in which a roll of the material is carried on the apparatus itself and is sealably joined to either another surface or another sheet of the material by means of heat-sealing wheels or an elongated burner tube.

In the area of industrial roofing and flooring applications and the like, partially-overlapping heat-sealable roll or sheet material is often used in which the edge portions of adjacent laid sheets of the roll material form an overlapping joint which can then be heat sealed or fused to form a protective sealed surface for the given roof or floor. An example of such a product is a Koppers Multipurpose Membrane, commonly referred to as KMM, manufactured and marketed by the Koppers Company, Inc. of Pittsburgh, Pa. 15219. The Standard KMM membrane is a five-layer laminate composed of a thick, flexible plastic core protected on each surface by a layer of modified bitumen material and an outer film of polyethylene. An Aluminum KMM product is also marketed by Koppers Company, Inc. also involving a five-layer laminate similar to the above product except that the top surface is a heavy, embossed aluminum foil while the bottom surface remains a film of polyethylene. A strip of aluminum foil about 4 inches wide, however, is removed along one side of the membrane in order that the overlapping contact surfaces will both be the bitumen material with only the thin polyethylene covering.

In the application of either KMM product, sheets are first rolled out onto the roof, foundation, plaza or other substantially level construction surface with the edge portions of each adjacent sheet of material being overlapped to form a joint. Each joint can then be heat sealed to form an excellent waterproofing membrane that protects the surface from the various weather conditions. In some applications, particularly with the aluminum KMM product, it is also desirable and advisable to use a cold adhesive to cement the individual sheets to the covered surface in addition to heat sealing the overlapping joints.

The present state of the art in handling and sealing such partially-overlapping heat-sealable products as both the Standard and Aluminum KMM membranes is for workmen to sufficiently heat the contact surfaces on the overlapping edge portions of the material by using some variety of hand-held hot air or gas welding gun and then to manually press the surfaces together thereby completing the sealed joint. This method of application is highly inefficient and time consuming and results in both increased labor costs and higher prices to the consumer.

One machine presently available, of which applicant is aware, that attempts to solve this problem is an automatic hot air welding machine marketed under the trademark "LEISTER-VARIUS" and available in the United States through the Bryan R. White Co., Inc. of 15075 Weststate, Westminster, Calif. 92683. A copy of a published advertising brochure available through the Bryan R. White Co., Inc. regarding the "LEISTER-VARIUS" machine is submitted herewith and is expressly incorporated herein by reference as applicant's best knowledge of the present state of the art with regard to this machine. The "LEISTER-VARIUS" machine itself, with the overlap welding accessory set attached thereto, apparently moves along one side of the overlapping edge portions of the roofing material and merely blows hot air in the direction of the overlapping joint and then presses the edge portions together with its relatively small side-mounted trailing wheel to thereby form the sealed joint.

SUMMARY OF THE INVENTION

One embodiment of the present invention comprises a roofing material handling and sealing machine for installing partially-overlapping heat-sealable roll roofing material and the like, including a frame having a front portion and a rear portion thereof, means for moving the frame along the joint formed by the overlapping edge portions of two laid sheets of the material, means for lifting only the upper overlapping edge portion of the material while the frame is moved therealong, means for heating both contact surfaces on the overlapping edge portions of the material while the upper portion is lifted and the frame is moved therealong, the means for heating being to an extent sufficient to allow the contact surfaces to be sealably joined, and means for pressing the heated contact surfaces together with sufficient force to sealably join the overlapping edge portions of the material.

The above embodiment of the present invention constitutes a significant advance over the prior art methods and apparata for handling and sealing partially-overlapping heat-sealable roll material such as the Standard and Aluminum KMM membranes. The embodiment is a significant advance over the manual sealing operation because means are provided for lifting the upper overlapping edge portion, heating both contact surfaces and then pressing the heated contact surfaces together to form a sealed joint while the frame of the machine is simply moved along the overlapping edge portions of the two laid sheets of the roll material. The embodiment also provides a significant improvement over the "LE-ISTER-VARIUS" installing machine because by lifting the upper overlapping edge portion prior to heating, a more uniform and more rapid heating of both contact surfaces can be achieved thereby increasing the efficiency of the installing operation and the quality of the final heat-sealed joint. This increase in efficiency also allows more rapid installation and thereby decreases both the time required for and the cost of installation.

In one mode of practicing the above embodiment, the frame has two spaced apart front wheels which straddle the overlapping edge portions of the material while the centrally positioned rear wheel against the joint itself. The means for lifting includes a lifting foot mounted to the frame and positioned on the underside thereof and the means for heating includes a gas torch also mounted to the frame back of the lifting foot and directed rearwardly to effectively heat both contact surfaces while the frame is moved along and over the overlapping joint. A bracket is also mounted to the frame near the rear wheel and additional weights can be added to the bracket to provide more force if needed to sealably join the overlapping edge portions of the roll material.

A second embodiment of the present invention comprises a method for installing partially-overlapping heat-sealable roll roofing material and the like, comprising the steps of moving the machine of the above embodiment along the joint formed by the overlapping edge portions to two laid sheets of the material, lifting only the upper overlapping edge portion of the material during the moving, heating both contact surfaces on the overlapping edge portions of the material during the lifting and moving, the heating being to an extent sufficient to allow the contact surfaces to be sealably joined, and pressing the heated contact surfaces together after the lifting and during the moving with sufficient force to sealably join the overlapping edge portions of the material.

The above second embodiment also constitutes a significant improvement over prior art methods for installing partially-overlapping heat-sealable roll roofing material and the like, such as both KMM membranes. By lifting the upper overlapping edge portion, heating both contact surfaces and then pressing them together to form a sealed joint all while moving the machine along the overlapping joint, the improved method of the second embodiment greatly simplifies the installing operation while also increasing overall efficiency and decreasing both the time required for and the cost of installation.

One object of the present invention is to provide an improved roofing material handling and sealing machine for installing partially-overlapping heat-sealable roll roofing material and the like.

Another object of the present invention is to provide an improved roofing material handling and sealing machine that straddles the overlapping edge portions of the material and automatically lifts the upper overlapping edge portion, heats both contact surfaces and then presses the heated surfaces together to sealably join the overlapping edge portions while the frame is simply moved along and over the overlapping joint.

Related objects and advantages of the present invention will be apparent from the following description.

BRIEF DESCRIPTION OF THE DRAWINGS

FIG. 2 is a top plan view of the machine in FIG. 1.

FIG. 3 is a front elevational view of the machine in FIGS. 1-3 in use with two laid sheets of roll roofing material.

DESCRIPTION OF THE PREFERRED EMBODIMENT

Figure 1:
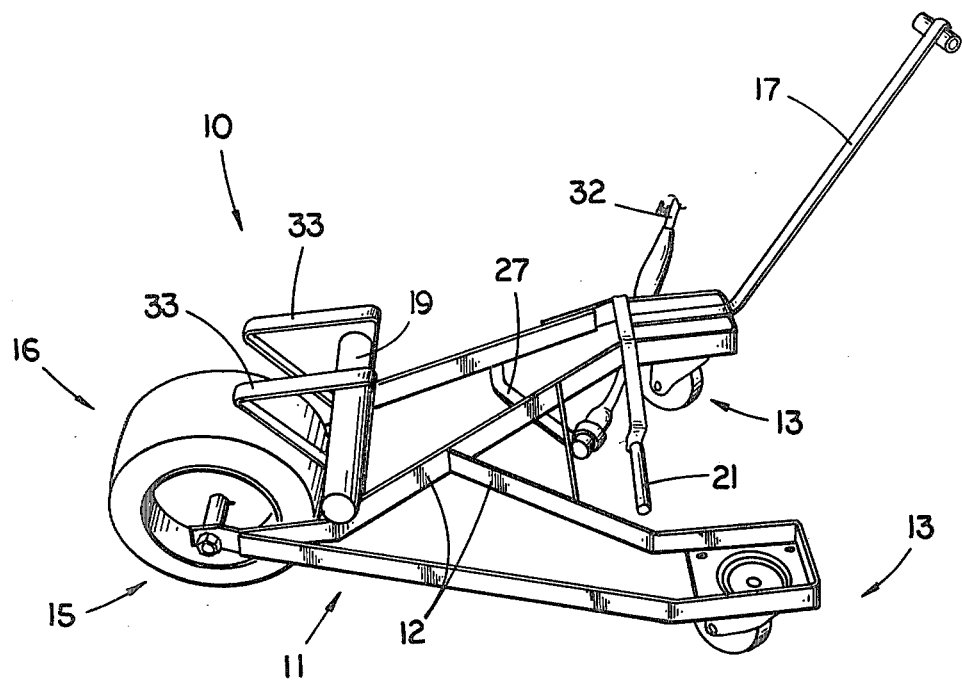
FIG. 1 is a perspective view of the roofing material handling and sealing machine comprising the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1-4, various views of the roofing material handling and sealing machine 10 comprising one preferred embodiment of the present invention are therein depicted. Machine 10 includes generally a skeletal frame 11 constructed from several individual steel bars 12 with two spaced apart front wheel assemblies 13 mounted to the front portion 14 of the frame. A single enlarged rear wheel assembly 15 is centrally mounted to the rear portion 16 of frame 10 and an elongated handle 17 is attached to front portion 14 to enable a workman to move or pull the machine along the surface of the construction area. In this context, "construction area" is meant to indicate an industrial roof, foundation, floor, plaza or other substantially level surface which is to receive a protective covering of a partially-overlapping heat-sealable roll material such as Standard or Aluminum KMM. For the remainder of the present application, specific reference will be made to KMM as such a material; but it is to be clearly understood that the machine of the present invention has application to any similar roll or sheet product or material.

Figure 4:
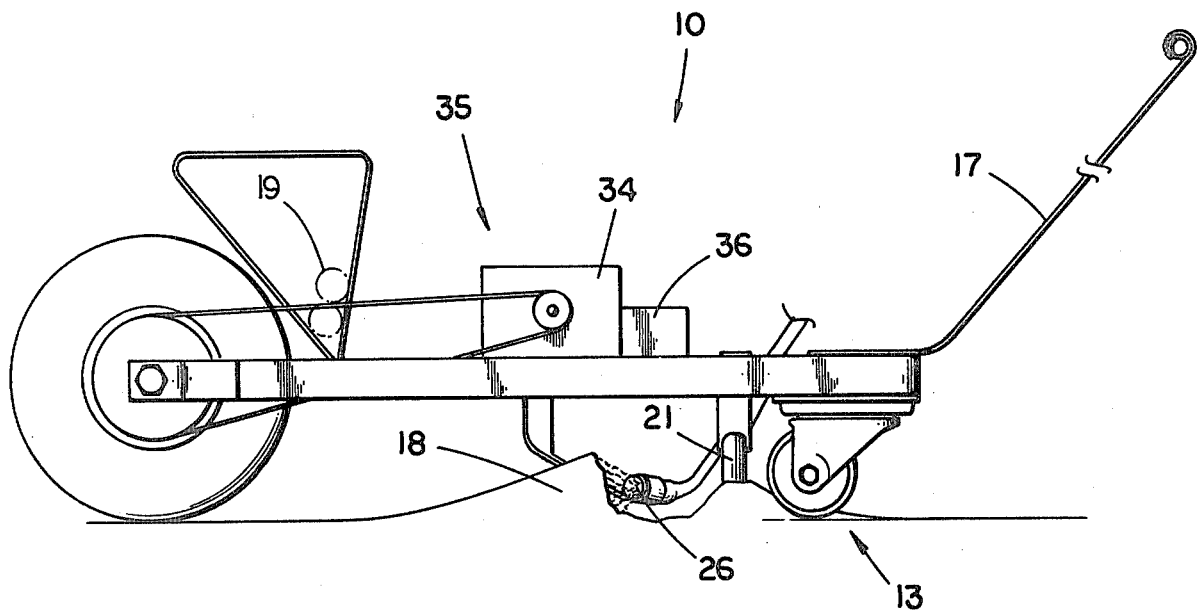
FIG. 4 is a side elevational view of a machine like that in FIG. 2 but with a motor, energy supply and drive belt added.

The means provided in the preferred embodiment for lifting the upper overlapping edge portion 18 of the material, as shown in FIGS. 3 and 4, includes a lifting foot or arm 21 positioned on the underside of frame 11 and mounted to the frame by means of a rigid bar member 22. Although many alternate varieties of lifting members can be successfully used in the present invention, lifting foot 21 of the preferred embodiment includes an elongated tubular and rotatable portion 23 that rotates along the contact surface 24 of upper portion 18 while the machine is moved along and over the overlapping joint, generally designated by numeral 25. This rotation eliminates any possibility of the material sticking or catching on the foot 21 and allows the workmen to more rapidly install the heat-sealable roll roofing or flooring material.

The means in machine 10 for heating both contact surfaces of the overlapping joint 25 includes a heating element 26 also positioned on the underside of frame 11 and back of lifting foot 21, the heating element being mounted to the frame by means of a second rigid bar member 27. The heating element is generally directed rearwardly and at an angle such that both contact surfaces 24 and 28 of the overlapping edge portions 18 and 31, respectively, are heated to an extent sufficient to cause the material to soften and allow the contact surfaces to be pressed together and sealably joined, or fused, when the rear wheel assembly 15 rolls over and presses against the overlapping portions. Although an electric hot air heating element may work equally well with the present invention, heating element 26 of the preferred embodiment is an adjustable gas propane torch that is connected to a gas supply (not shown) by means of an elongated hose 32.

The means associated with the preferred embodiment for pressing the heated contact surfaces together to form a sealed joint, as above indicated, includes the centrally positioned rear wheel assembly 15 which presses against and rolls along the overlapping joint. The dimensions and weight of rear wheel assembly 15 may, of course, vary substantially according to many factors. Although not required, it has been found beneficial, however, to have the rear wheel be sufficiently wide to completely cover the overlapping edge portions thereby assuring an effective and complete seal. A pneumatic-tired golf cart wheel works very well.

Two brackets 33 are also mounted to frame 11 of machine 10 adjacent rear wheel assembly 15. These brackets provide a location for adding additional weights 19, generally shown by phantom lines in FIGS. 3 and 4 and solid line in FIG. 1, to the frame if more force is needed to effectively seal and fuse the overlapping joint formed by edge portions 18 and 31.

In practice, machine 10 is positioned as shown in FIGS. 3 and 4 with the two front wheel assemblies 13 straddling the overlapping joint 25 and rear wheel assembly 15 pressing thereagainst. Since wheels 13 are caster wheels, positioning and steering are easy. The upper edge portion 18 of the sheet material rests against lifting foot 21 and heating element 26 is positioned to heat both contact surfaces 24 and 28 thereby causing the surfaces to soften and become plastic and allowing them to be sealably joined when the weighted rear wheel assembly rolls over and presses against the overlapping joint.

Various modifications may be effectively incorporated into machine 10 of the preferred embodiment and such are clearly within both the scope and contemplation of the present invention. For example, the specific angle and length of the lifting foot may vary greatly and the position and amount of heat supplied by the heating element may also vary according to a great number of factors including such things as the atmospheric temperature, the specific composition of the heat-sealable roll material and the amount of pressure to be used in fusing the heated overlapping surfaces. With either the Standard or Aluminum KMM material, the bitumen layer of the membrane is rapidly heated by a direct flame with the polyethylene film burning off and the bitumen becoming sufficiently plastic to flow under pressure with only a limited amount of heat. In fact, a problem often experienced with KMM membrane is one of overheating in which the bitumen becomes so plastic that it flows excessively out of the overlapping joint when only normal pressure is applied. This condition, however, is somewhat reversed in cold weather when more pressure is generally needed to effectively fuse the two contact surfaces of the joint.

A further possible modification of machine 10 of the preferred embodiment is to motorize the unit by mounting a sufficiently powerful motor, generally designated by box 34 in FIG. 4, to the top of frame 11. Any relatively small conventional gas-operated or electric DC motor can be effectively modified for use with the machine of the present invention and a direct drive connection can be readily made with rear wheel assembly 15 by means of any standard pulley, belt and gear arrangement 35. Box 36 in FIG. 4 further designates the power source for the motor 34 and can be either a gas tank or an appropriately sized battery.

The preferred method of the present invention includes the steps of moving machine 10 of the above embodiment along the joint 25 formed by the overlapping edge portions 18 and 31 of the material, lifting only the upper overlapping edge portion 18 during the moving, heating both contact surfaces 24 and 28 on the overlapping edge portions of the material during the lifting and the moving, and pressing the heated contact surfaces together after the lifting and during the moving. As previously discussed, the heating step must be to an extent sufficient to allow the contact surfaces to be sealably joined and the pressing must be with sufficient force to sealably join the overlapping edge portions of the material thereby forming the protective covering.

As further above discussed, the lifting in the preferred method is accomplished by resting the upper portion 18 against lifting foot 21 and the heating is by means of heating element 26 mounted back of the lifting foot. The moving step also includes straddling the overlapping edge portions 18 and 31 with the two front wheel assemblies 13 with the rear wheel assembly 15 pressing against the overlapping joint 25 formed thereby.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A roofing material handling and sealing machine for installing partially-overlapping heat-sealable roll roofing material and the like, comprising:
   (a) A frame having a front portion and a rear portion thereof;
   (b) means for moving said frame along the joint formed by the overlapping edge portions of two laid sheets of the material;
   (c) means for lifting only the upper overlapping edge portion of the material while said frame is moved therealong;
   (d) means for heating both contact surfaces on the overlapping edge portions of the material while the upper portion is lifted and said frame is moved therealong, said means for heating being to an extent sufficient to allow the contact surfaces to the sealably joined; and
   (e) means for pressing the heated contact surfaces together with sufficient force to sealably join the overlapping edge portions of the material, said frame including two spaced-apart front wheel assemblies and a rear wheel assembly mounted thereto, said means for moving and for pressing including means for straddling the overlapping edge portions of the material with the two front wheel assemblies while the rear wheel assembly presses against the overlapping joint formed thereby, said means for lifting including a lifting foot mounted to said frame and positioned on the underside thereof, said lifting foot being forward of said means for heating, said means for heating including a heating element mounted to said frame and positioned back of said lifting foot, said lifting foot including a rotating elongated portion that rotatably contacts the upper overlapping edge portion of the material while said frame is moved therealong.

2. The machine in claim 1 additionally comprising:
(a) a bracket mounted to said frame; and
(b) means for varying the sealing force applied to the overlapping joint by the rear wheel assembly by varying the number of added weights in said bracket.

3. The machine in claim 2 in which said frame is a skeletal structure composed of a plurality of steel bars.

4. The machine in claim 3 in which said heating element is an electric hot air blower.

5. The machine in claim 3 in which said heating element is a gas propane torch.

6. The machine in claim 5 and additionally comprising a motor mounted on said frame and drivably connected to said rear wheel assembly for moving said frame along the overlapping joint formed by the material.

7. A roofing material handling and sealing machine for installing partially-overlapping heat-sealable roll roofing material and the like, comprising:
(a) a frame having a front portion and a rear portion thereof;
(b) means for moving said frame along the joint formed by the overlapping edge portions of two laid sheets of the material;
(c) means for lifting only the upper overlapping edge portion of the material while said frame is moved therealong;
(d) means for heating both contact surfaces on the overlapping edge portions of the material while the upper portion is lifted and said frame is moved therealong, said means for heating being to an extent sufficient to allow the contact surfaces to be sealably joined; and
(e) means for pressing the heated contact surfaces together with sufficient force to sealably join the overlapping edge portions of the material, said means for lifting including the lifting foot mounted to said frame and positioned on the underside thereof, said lifting foot being forward of said means for heating, said heating means including a hot-gas producing element which is oriented to direct a flow of hot gas in a rearward direction toward an area behind said lifting foot.

* * * * *